United States Patent [19]

Chang

[11] Patent Number: 5,465,454
[45] Date of Patent: Nov. 14, 1995

[54] DUAL WINDSHIELD WIPER HAVING SWINGING AND PIVOTING RIBS

[76] Inventor: Tsan-Yun Chang, No. 13, Hsin Chuan, Wuchuen First Road, Wuku Industrial Area, Taipei Hsien, Taiwan

[21] Appl. No.: 320,225

[22] Filed: Oct. 11, 1994

[51] Int. Cl.$^6$ ..................................................... B60S 1/38
[52] U.S. Cl. ........................... 15/250.41; 15/250.42; 15/250.31; 15/250.33; 403/116
[58] Field of Search ................ 15/250.33, 250.31, 15/250.42, 250.40, 250.41, 250.36, 250.22, 250.19; 403/112, 116, 117

[56] References Cited

U.S. PATENT DOCUMENTS

| | | | |
|---|---|---|---|
| 2,025,888 | 12/1935 | Oliver | 15/250.33 |
| 2,266,385 | 12/1941 | Scinta | 15/250.33 |
| 2,807,821 | 10/1957 | Scinta | 15/250.42 |
| 2,955,313 | 10/1960 | Anderson | 15/250.42 |
| 3,009,185 | 11/1961 | Adams | 15/250.41 |
| 3,644,957 | 2/1972 | Deibel et al. | 15/250.42 |
| 4,009,504 | 3/1977 | Arman | 15/250.42 |
| 4,287,634 | 9/1981 | Speth | 15/250.33 |
| 4,793,020 | 12/1988 | Stratton et al. | 15/250.42 |
| 5,257,436 | 11/1993 | Yang | 15/250.33 |
| 5,325,563 | 7/1994 | Cayan | 15/250.33 |

FOREIGN PATENT DOCUMENTS 2398645  3/1979  France ........................ 15/250.33

Primary Examiner—Gary K. Graham
Attorney, Agent, or Firm—Bacon & Thomas

[57] ABSTRACT

A windshield wiper comprising a large rib, two middle ribs, two small ribs and a wiper blade composed of double blade members with angle difference, wherein two ends of the large rib that connect with the middle rib are mobilely longitudinally swingable through a small angle and transversely rotatable through a fixed angle responsive to the change of curvature of a windshield, whereby the double blade members are always adapted to the curvature of the windshield and tightly attached thereto during the alternately wiping operation thereof.

3 Claims, 9 Drawing Sheets

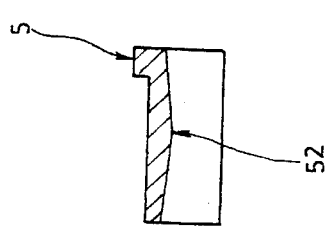
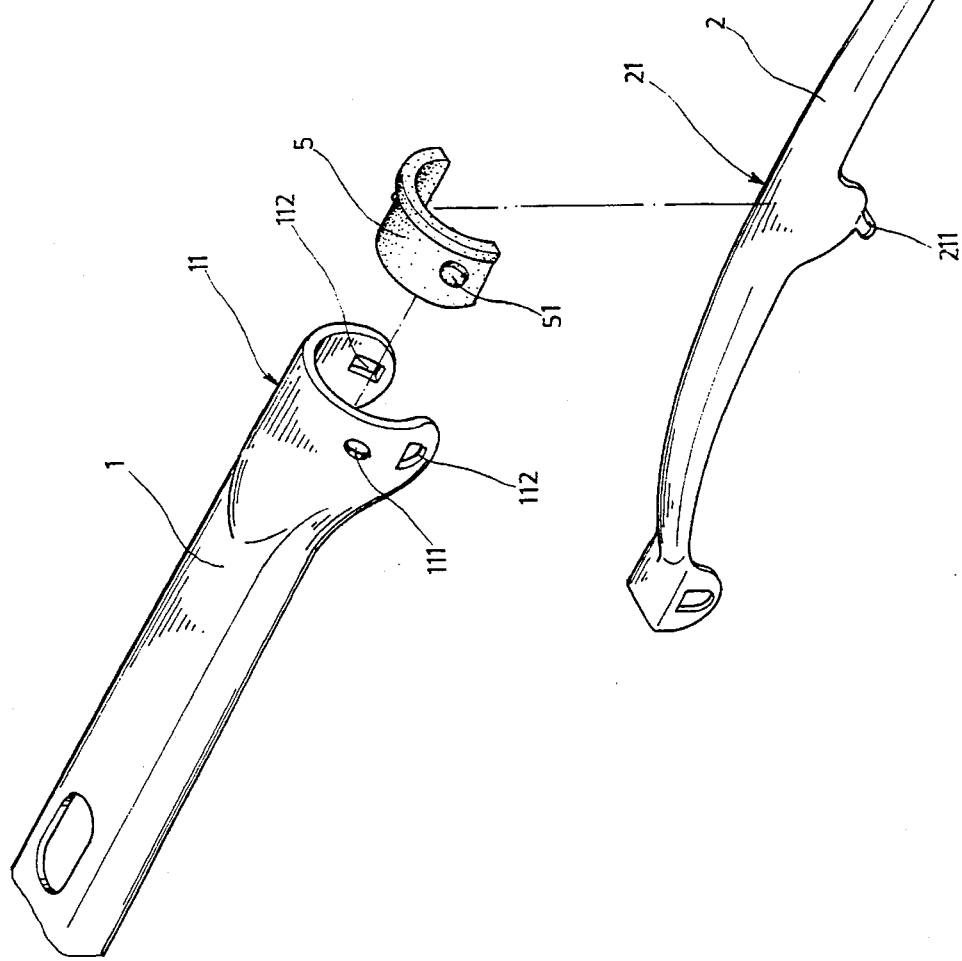

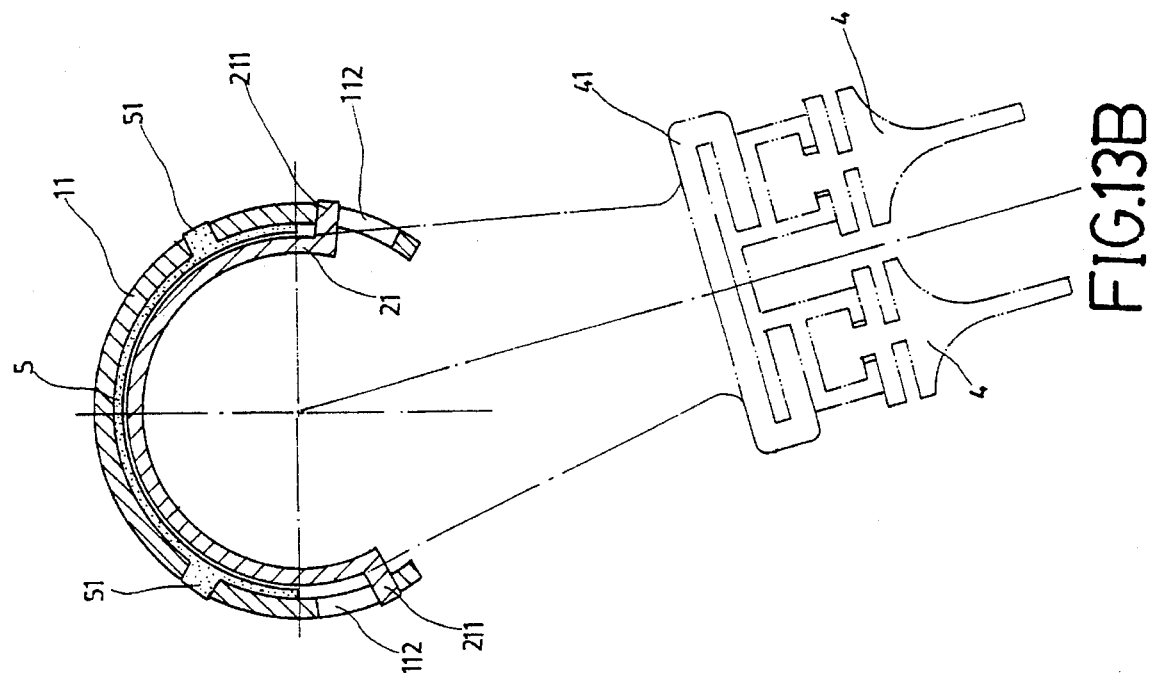
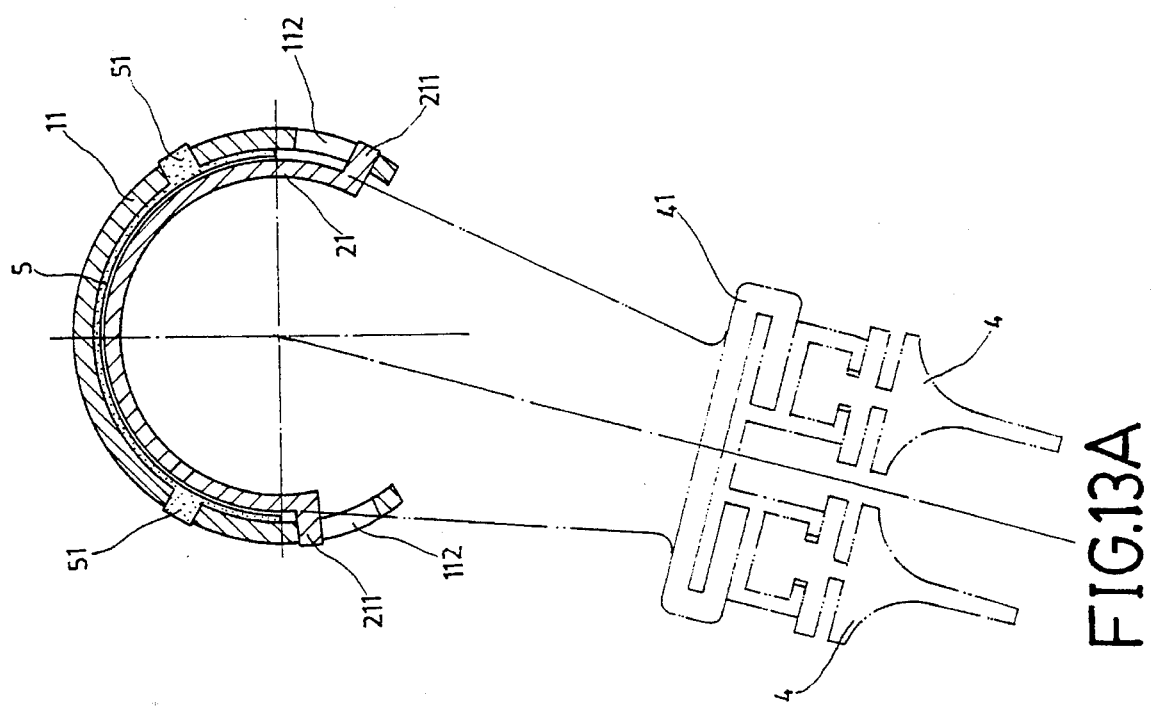

DUAL WINDSHIELD WIPER HAVING SWINGING AND PIVOTING RIBS

BACKGROUND OF THE INVENTION

The present invention relates to an improved windshield wiper in which the double blade members with angle difference are mobilely adjusted responsive to the change of the curvature of the windshield so as to always adapt to the curvature and tightly attach thereto at any part during the wiping operation for achieving an improved wiping effect.

FIG. 1 shows a conventional windshield wiper which is composed of a large rib A, two middle ribs B, two small ribs C and a wiper blade D. Each of the ribs is lengthwise pivotally connected with the other in order to tightly and freely adaptably attach the wiper blade to the curved windshield of a car and achieve a satisfactory wiping effect. As shown in FIG. 2, during the operation of the windshield wiper, the position thereof on the curved glass windshield is changed instantaneously and the shape of the wiper is simultaneously changed to meet the varying curvature of the windshield. During each reciprocal movement of the wiper blade, the curvature of the wiper blade is changed periodically. Referring to FIGS. 3 and 4, one end of the large rib A is disposed with a U-shaped channel for the middle rib B to fit thereinto. A plastic pad member E is inserted between the large and middle ribs. The pad member has two lateral lugs which extend from the pad member into the pivot holes of the ribs so as to pivotally connect the ribs with each other. The pad member is plate-like and resilient, permitting the middle rib to lengthwise swing with the end of the large rib serving as a fulcrum.

In operation, the conventional windshield wiper often leaves a not completely wiped area in the wiping face of the windshield. Moreover, even different not completely wiped areas will be left by the same wiper with respect to different kinds of cars. This is because that in the rotational movement, the axial center of the double wiper blades with difference of angle is positioned on a plane glass and the rotary axial center is just located in the same straight line. Therefore, the rotation can be smoothly performed and the wiper blade can be totally opposed against and tightly contact with the glass surface and achieve an optimal wiping effect. However, the windshield of a general car is curved and different brands of cars will have differently curved glass windshield to cooperate with the integral design of the cars. Since the wiper blades are tightly attached to the glass surface, the wiper blades will become curved and thus it is impossible for the double wiper blades with angle difference to directly accomplish the angle shift of axial center rotation at the wiping position. Therefore, such arrangement is not suitable for the general car windshield.

SUMMARY OF THE INVENTION

It is therefore a primary object of the present invention to provide an improved windshield wiper in which the two ends of the large rib that connect with the middle rib are provided with a structure which can transversely rotate through a fixed angle and longitudinally swing, whereby the entire wiper blade can be rotated to have an angle shift and mobilely adjusted responsive to the change of the curvature of the windshield so as to always adapt to the curvature and tightly attach thereto at any part during the wiping operation for achieving an improved wiping effect.

The present invention can be best understood through the following description and accompanying drawing, wherein:

BRIEF DESCRIPTION OF THE DRAWINGS

FIG. 6 is a perspective view showing one end of the large rib and a portion of the middle rib connecting therewith according to the present invention;

FIG. 7 is a side sectional view of the pad member in the wiper of the present invention;

FIGS. 13A and 13B are sectional views showing that the parallel double blade members of the present invention are transversely rotated.

DETAILED DESCRIPTION OF THE PREFERRED EMBODIMENTS

Figure 1:
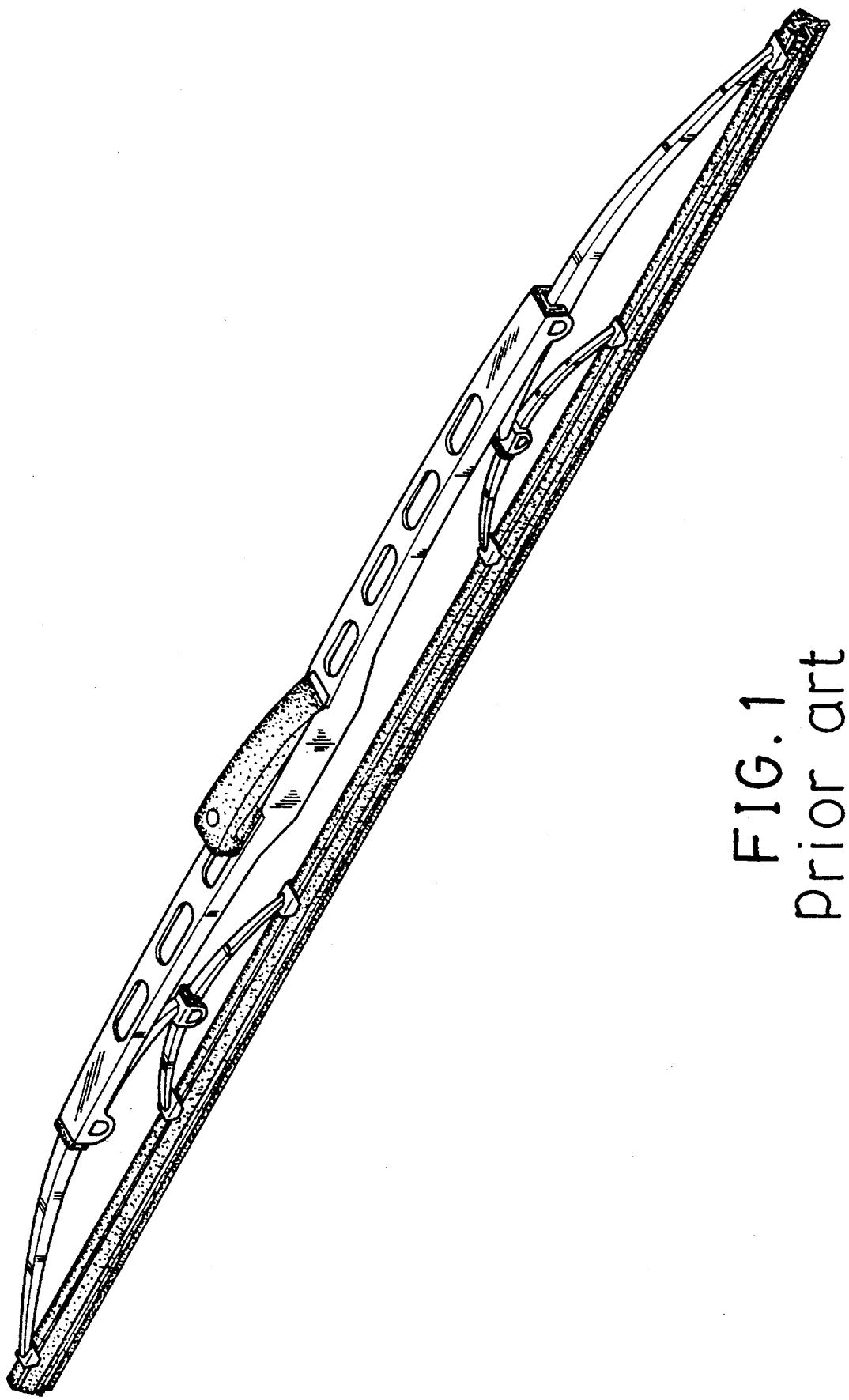
FIG. 1 is a perspective assembled view of a conventional windshield wiper.
Figure 2:
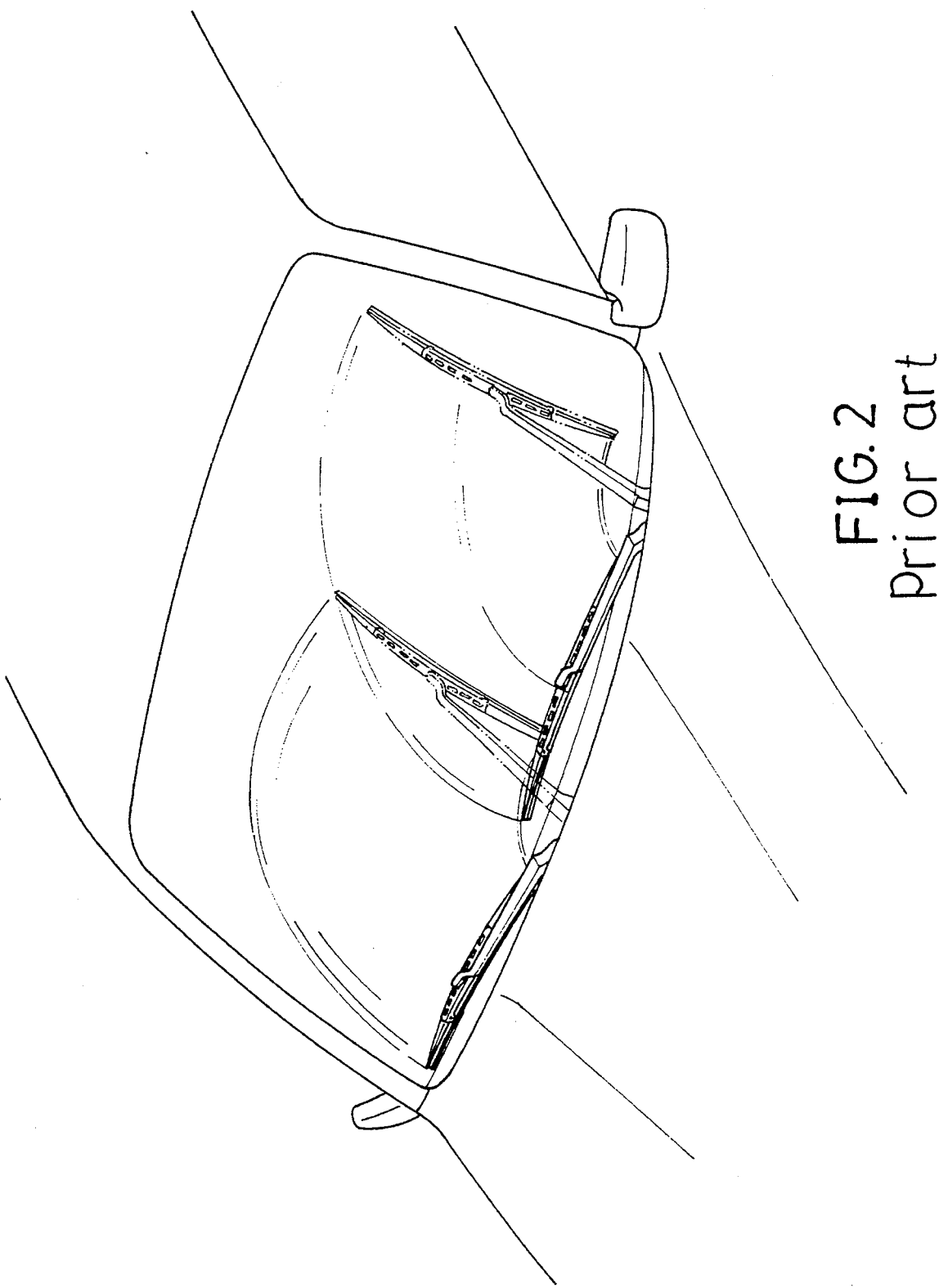
FIG. 2 shows the operation of the conventional windshield wiper on the windshield.
Figure 3:
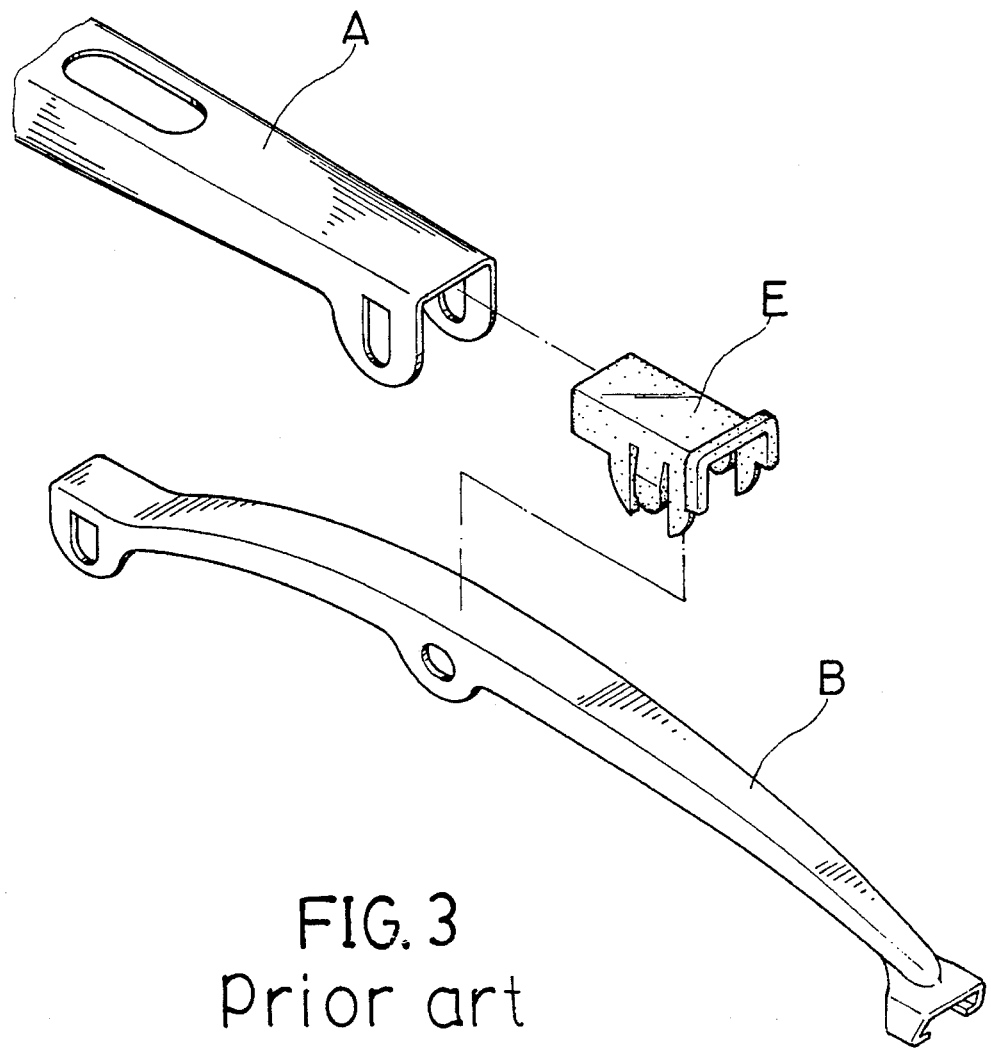
FIG. 3 is a perspective view showing one end of the large rib and a portion of the middle rib connecting therewith according to the conventional windshield wiper.
Figure 4:
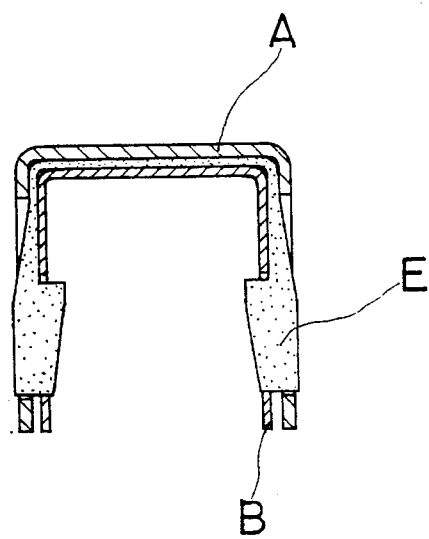
FIG. 4 is a sectional assembled view according to FIG. 3.
Figure 5:
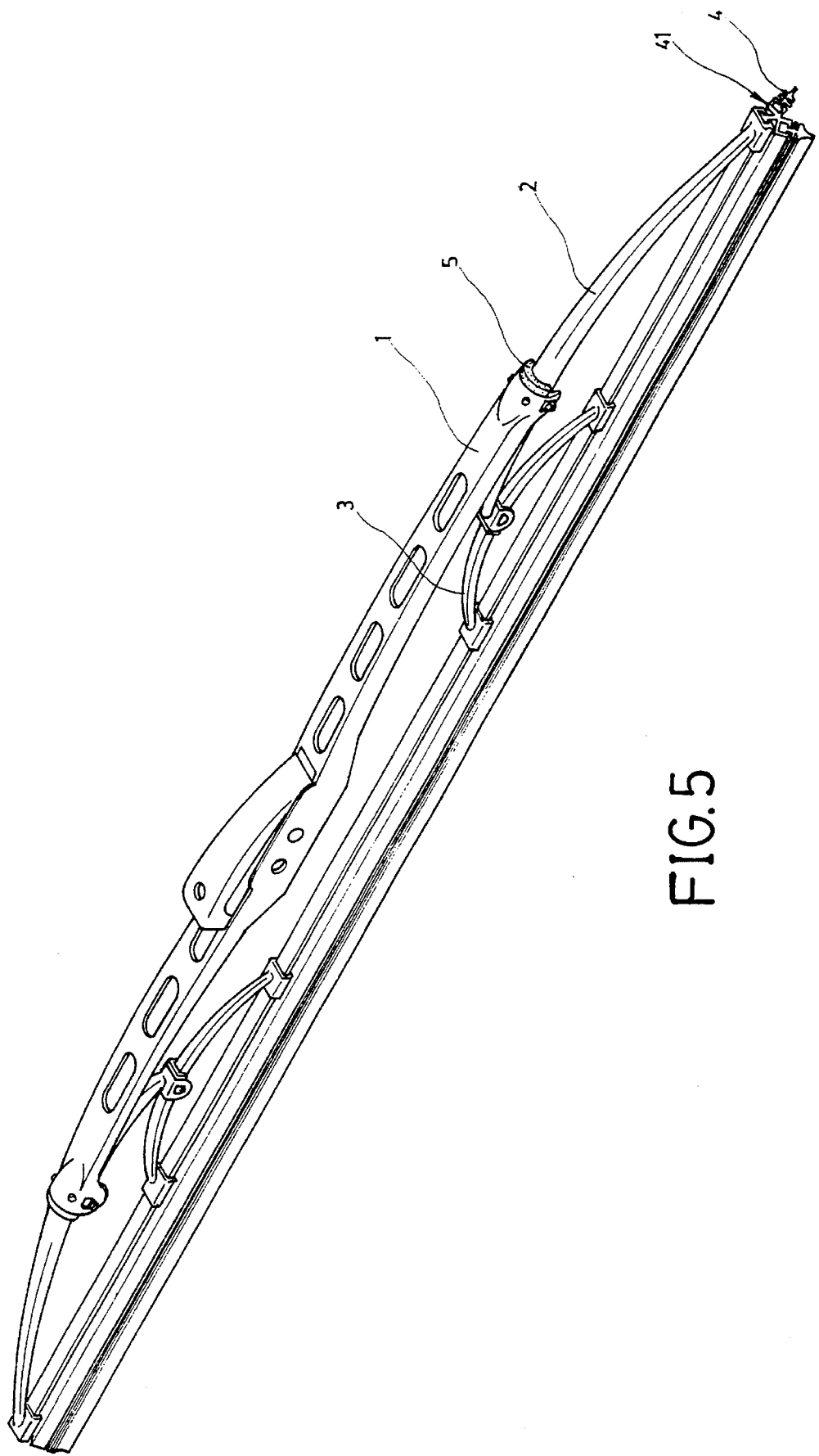
FIG. 5 is a perspective assembled view of the present invention.
Figure 8:
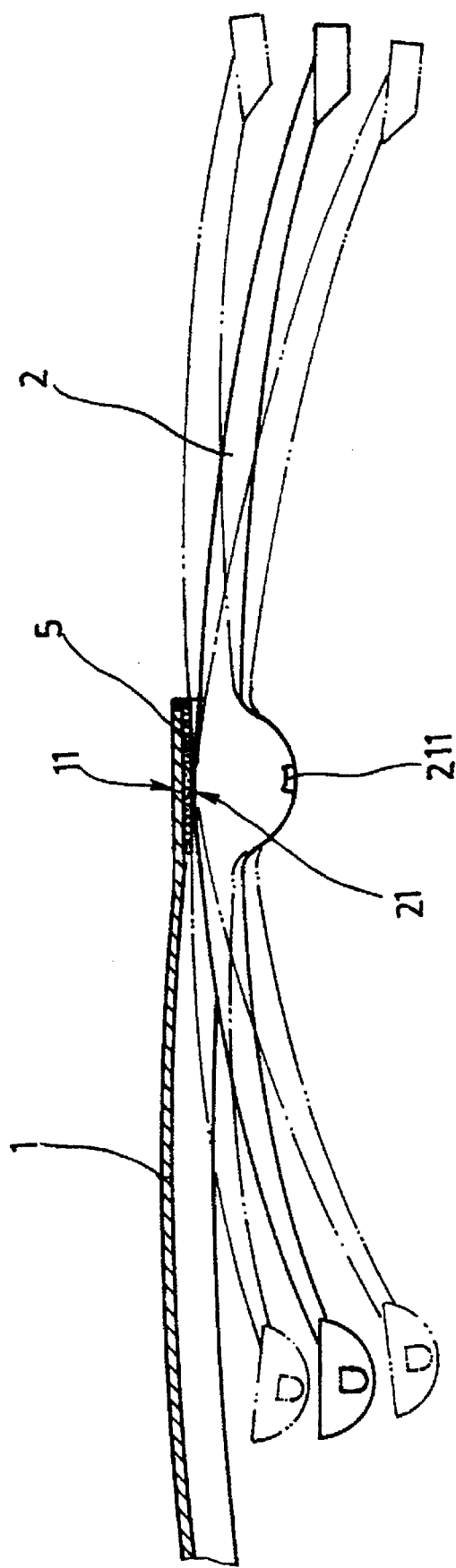
FIG. 8 shows that the middle rib longitudinally swings relative to the large rib of the present invention.
Figure 10:
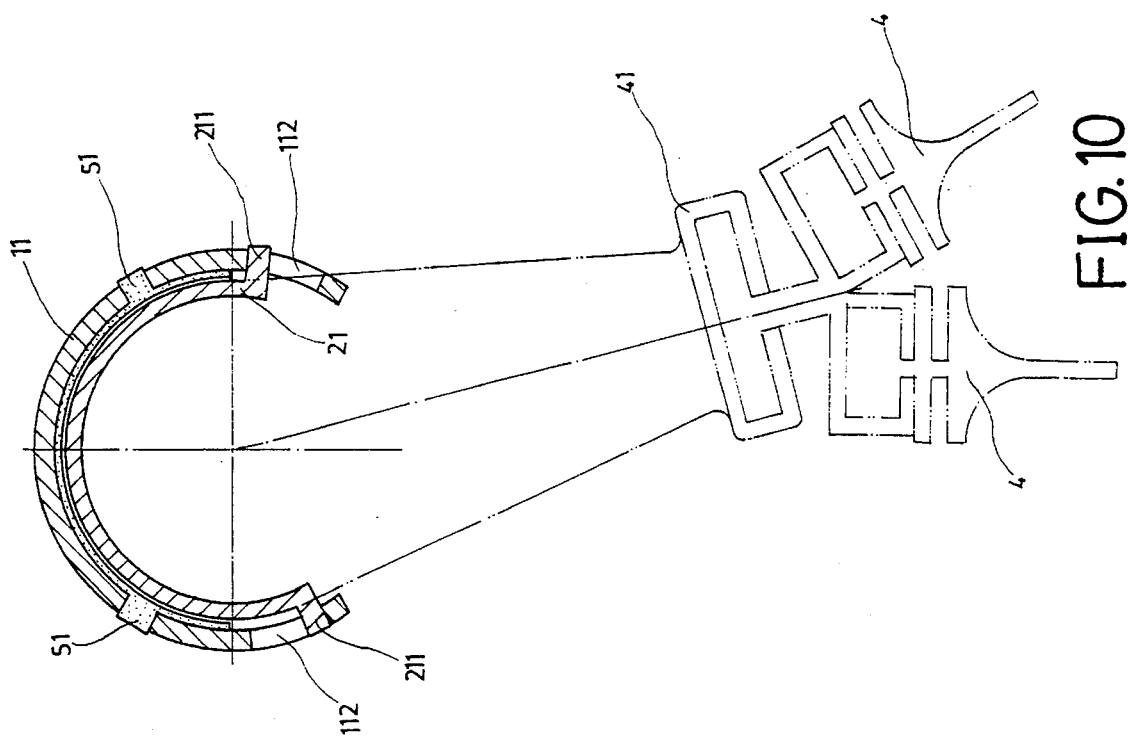
FIG. 10 is a sectional view showing that the middle rib is transversely rotated within the end of the large rib to a right stop point.
Figure 9:
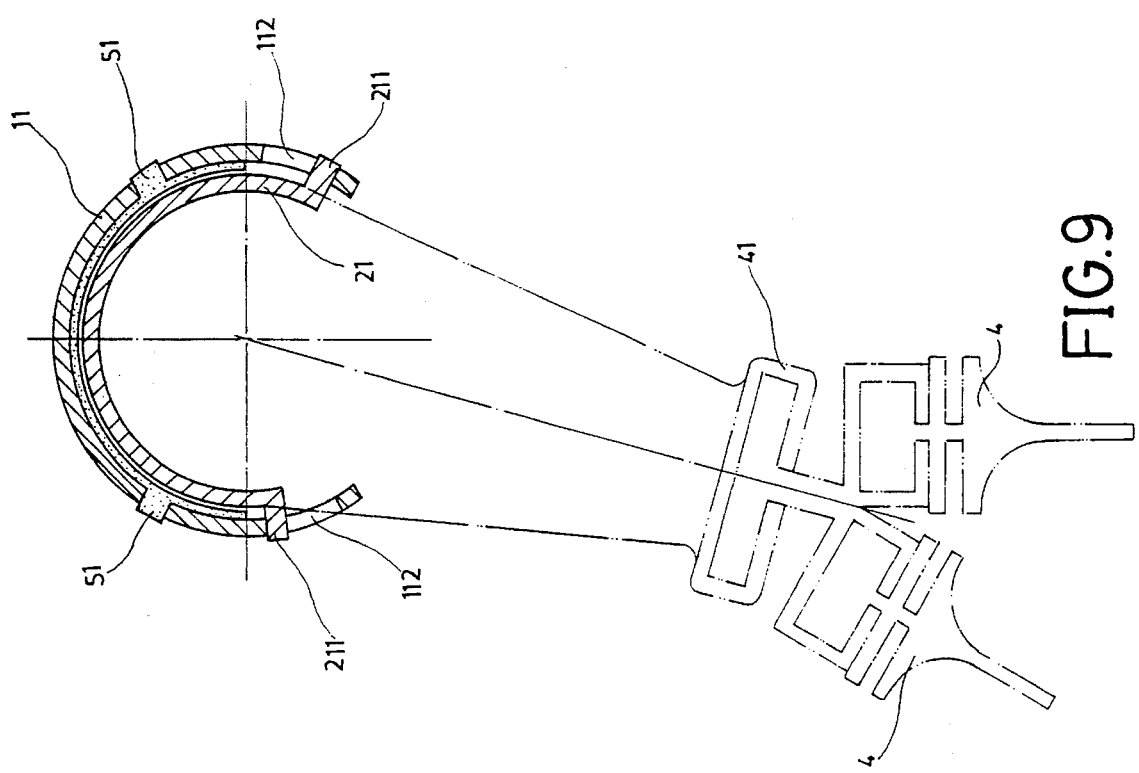
FIG. 9 is a sectional view showing that the middle rib is transversely rotated within the end of the large rib to a left stop point.

Please refer to FIG. 5. The windshield wiper of the present invention includes a large rib 1, two middle ribs 2, two small ribs 3, a wiper blade unit 6 and pad members 5. The wiper blade unit 6 is composed of double blade members 4 with angle difference, that is, the blade members are radially arranged and spaced by an angle difference. Conventionally, a plastic long strip 41 is disposed at the double blade members. The long strip 41 has a lower end for fitting the blade members thereinto and an upper end for transversely rotatably connecting with the ends of the middle rib 2 and small rib 3, that is, the blade members can be rotated through a certain angle at the ends of each small rib during the reciprocal wiping movement to wipe the windshield by turns. However, since the entire wiper blade is attached to the curved glass windshield, the whole plastic long strip 41 and the blade members 4 are curved. As shown in FIG. 5, there are totally six clamping points of the middle and small ribs 2 and 3 for clamping and holding the long strip 41 and exerting force on the wiper blade to press the same against the glass surface. When the plastic long strip 41 is curved, the six clamping points fail to reside in the same straight line, that is, fail to coaxially rotate. However, such double blade members must rotate during the wiping operation. Therefore, the six clamping points will be divided into five divisions to respectively rotate. However, the plastic long strip 41 and the wiper blade members 4 are integrally connected so that the rotation thereof will be obstacled and unsmooth and tend to cause departure of the blade members. Even though the wiper blade is strongly rotated, some parts thereof will be unable to sungly attach to the glass surface. This will result in that some portions of the wiping area are not completely clearly wiped. In contrast to the conventional device, in the present invention, the rotation with angle difference is established between two ends 141 of the large rib 1 and the conjunction portions of the middle ribs 2. As shown in FIG. 6, the ends 11 of the large rib 1 are connected with the middle ribs 2 with the pad member 5 located therebetween. Conventionally, the windshield wiper is fixed in such connection points and can be only longitudinally swung through a small angle. In the present invention, the connection points (middle portion of the middle ribs [see FIG. 9]) are longitudinally swingable in a plane P, which extends vertically out of the page, about swing axis Y and transversely pivotable about pivot axis X, which extends vertically out of the page, through a certain angle. FIG. 6 shows a preferred embodiment thereof, wherein two ends 11 of the large rib 1 are formed with arch bodies and the pad members 5 are fitted in the arch bodies, serving as a frictional face of the rotation or swinging movement. The pad member 5 has a projection 51 on the outer surface for fixedly being inserted into a corresponding insert hole 111 of the end 11 of the large rib. The middle rib 2 is connected with the inner face of the pad member 5. The middle portion 21 of the middle rib 2, which connects with the large rib is also formed with an arch body to fit with the pad member 5 at the end 11 of the large rib 1. The middle portion 21 has two lateral lugs 211 for inserting into the corresponding cooperative holes 112 of the large rib 1. The lug 211 is preferably arched and the cooperative hole 112 is a relatively large hole with wider upper portion and arched lower portion, whereby a clearance exists in the cooperative hole 112, permitting the lug 211 to longitudinally swing within the hole 112 as shown in FIG. 8 and transversely rotate as shown in FIGS. 9 and 10. By means of the cooperation of the diametric width of the left and right cooperative holes 112, the same serve as the stop points for the left and right rotation of the middle rib 2 to create a reciprocal periodical rotation with fixed angle. The value of the fixed angle can be determined by means of experiments in accordance with the angle of the two blade members 4. FIG. 7 shows a sectional view of the pad member 5. The arch face of the pad member 5 is most preferably semicircular and the thick upper end thereof can be slope-shaped to form a convex central portion 52 serving as the support face for the longitudinal swinging movement of the middle rib 2 so as to achieve a better swinging effect. The pad member 5 is generally made of plastic material and disposed between the large and middle ribs 1, 2 to serve as a contact face and lubricate the large and middle ribs and thus smoothen the interaction therebetween and reduce noise. In addition, by means of the slight resilience of the plastic pad member, the structural flexibility and strength of the large and middle ribs are enhanced during the relative rotation and swinging therebetween and the loosening phenomenon of the large and middle ribs caused by the rigidity thereof and the clearance therebetween can be avoided. Of cource, this is not the situation that will happen inevitably. Because the windshield wiper as a whole is tightly attached to the glass surface by means of the forcing of the wiper arm, the respective components of the windshield wiper will suffer the resilient force of the wiper arm. Therefore, in the wiping operation, the middle rib is always slightly swung to adapt itself to the varying curvature of the glass surface or rotate to alternately wipe the glass surface when the direction of the reciprocal movement changes. Therefore, the whole windshield wiper can stably move over the windshield without loosening. In the other words, the pad member 5 is not a necessary component. A concave portion can be directly formed at the end 11 of the large rib 1 corresponding to the convex face 52 to achieve the same function as the convex face 52 of the pad member 5.

Figure 11:
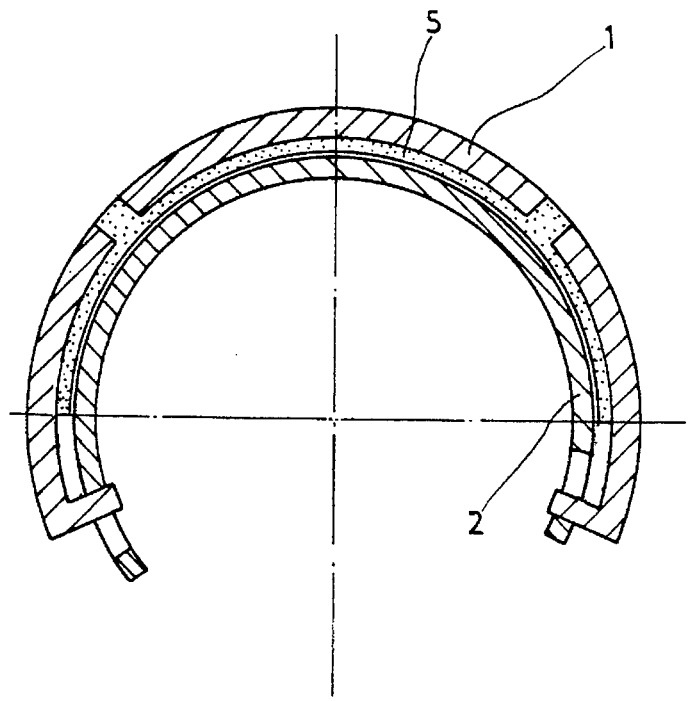
FIG. 11 is a sectional view of another embodiment of the present invention, wherein the middle rib is transversely rotated within the end of the large rib.
Figure 12:
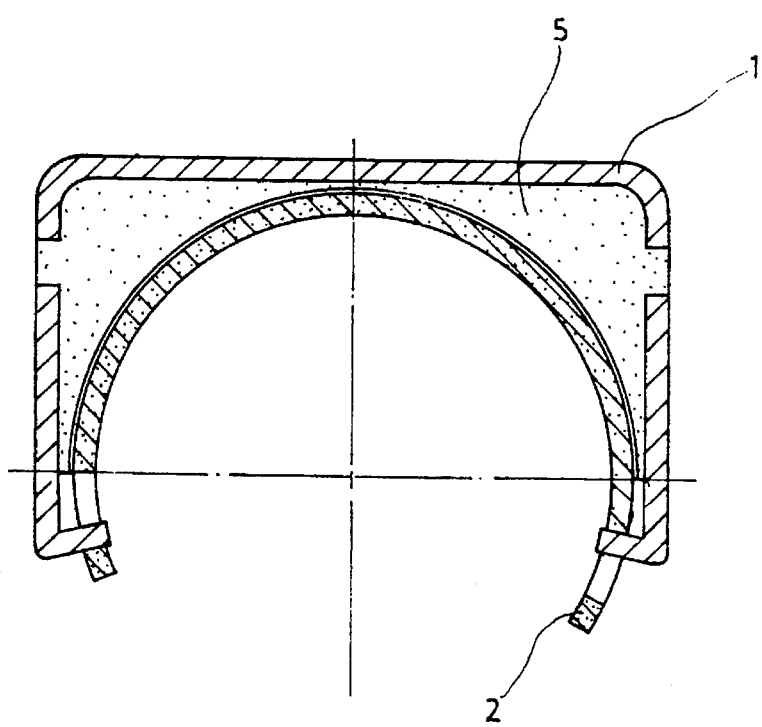
FIG. 12 is a sectional view of still another embodiment of the present invention, wherein the middle rib is transversely rotated within the end of the large rib.

FIGS. 11 and 12 show two alternative embodiments derived from the rotation relationship shown in FIGS. 9 and 10, wherein the cooperation relationship between the lug 211 of the middle rib 2 and the hole 112 of the large rib 1 is reversed, that is, the lug is disposed on the large rib 1 while the hole is disposed on the middle rib 2 to achieve the rotational relationship similarly and also have the left and right two stop points to present the rotation with a fixed angle. In FIG. 12, if the middle rib 2 is fitted in the pad member 5, then the end of the large rib 1 is not limitedly arch shaped. The inner face of the pad member 5 can serve to contact with the middle rib during the rotation. The end of the large rib 1 is kept U-shaped. FIG. 13 shows that the double blade members are parallel without angle difference while when the two ends of the large rib 1 that contact with the middle rib 2 serve as the rotational axial center, the parallel double blade members also have the alternately wiping effect as those with angle difference.

The above structures and components can be actually manufactured and assembled without technical problem. By means of such windshield, the shortcomings of the conventional ones can be eliminated. This is because the rotational axial center of the double blade members of the present invention is located at the ends of the large rib 1 that connect with the middle rib 2 and these two ends form the rotation in a straight line. No matter how the middle rib 2 is slightly longitudinally swung due to the variation of the curvature of the windshield, the rotational relationship can be stably and smoothly accomplished to achieve the alternately wiping operation of the double blade members.

It is to be understood that the above description and drawings are only used for illustrating one embodiment of the present invention, not intended to limit the scope thereof. Any variation and derivation from the above description and drawings should be included in the scope of the present invention.

What is claimed is:

1. A windshield wiper for reciprocal movement over a windshield, said wiper comprising:

a) an elongated large rib having opposite ends and a longitudinal plane therein passing through said ends, each end defining a concavely curved surface;

b) at least one elongated middle rib having a middle portion with a convexly curved surface;

c) at least one small rib attached to the at least one elongated middle rib;

d) a wiper blade unit having double blade members, said unit is attached to the at least one middle rib and to the at least one small rib; and, e) attaching means to attach the at least one middle rib to one end of the large rib such that the at least one middle rib may swing in said longitudinal plane about a swing axis and pivot with respect to the large rib about a pivot axis lying in said plane and generally perpendicular to said swing axis such that said blade members can alternatively engage the windshield during the reciprocal movement, the attaching means comprising:

i) a pad member attached to the end of the large rib on the concavely curved surface thereof, the pad member having a concavely curved surface receiving the convexly curved surface of the middle rib;

ii) transversely symmetrical holes formed in one of the middle portion of the middle rib and said one end of the large rib, each hole having an upper portion and a relatively narrower lower portion; and iii) laterally extending lugs extending from the other of the middle portion of the middle rib and said one end of the large rib and inserted in the transversely symmetrical holes.

2. The windshield wiper of claim 1 wherein the lugs extend laterally outwardly from the middle portion of the at least one middle rib and the transversely symmetrical holes are formed in said one end of the large rib.

3. The windshield wiper of claim 1 wherein the lugs extend laterally inwardly from said one end of the large rib and the transversely symmetrical holes are formed in the middle portion of the at least one middle rib.

* * * * *